(12) United States Patent
Wechsel et al.

(10) Patent No.: US 11,346,458 B2
(45) Date of Patent: May 31, 2022

(54) PROPORTIONAL HYDRAULIC VALVE

(71) Applicant: HAWE Hydraulik SE, Aschheim (DE)

(72) Inventors: Thomas Wechsel, Neubiberg (DE); Bernd Faber, Rosenheim (DE)

(73) Assignee: HAWE Hydraulik SE, Aschheim (DE)

( * ) Notice: Subject to any disclaimer, the term of this patent is extended or adjusted under 35 U.S.C. 154(b) by 0 days.

(21) Appl. No.: 16/841,363

(22) Filed: Apr. 6, 2020

(65) Prior Publication Data

US 2020/0332911 A1 Oct. 22, 2020

(30) Foreign Application Priority Data

Apr. 17, 2019 (DE) .................... 10 2019 205 640.7

(51) Int. Cl.
*F16K 3/26* (2006.01)
*F16K 31/06* (2006.01)

(52) U.S. Cl.
CPC ............ *F16K 31/0613* (2013.01); *F16K 3/26* (2013.01); *F16K 31/0693* (2013.01); *F16K 31/0696* (2013.01)

(58) Field of Classification Search
CPC .. F16K 17/00; F16K 11/0716; F16K 11/0708; F16K 3/246; F16K 3/24; F16K 3/267; F16K 3/26; F15B 13/022; F15B 13/027
See application file for complete search history.

(56) References Cited

U.S. PATENT DOCUMENTS

| | | | | |
|---|---|---|---|---|
| 4,313,467 A | * | 2/1982 | Lang | B62D 5/08 137/625.3 |
| 6,397,890 B1 | * | 6/2002 | Mickelson | F15B 13/0402 137/625.34 |
| 6,450,194 B1 | * | 9/2002 | Wasson | F15B 13/0402 137/351 |
| 8,684,038 B2 | | 4/2014 | Schudt et al. | |
| 2005/0133098 A1 | * | 6/2005 | Ino | F15B 13/0402 137/625.65 |

(Continued)

FOREIGN PATENT DOCUMENTS

DE  10 2005 022 693 A1  11/2006
DE     102010039918 A1   3/2012

(Continued)

*Primary Examiner* — Kelsey E Cary
(74) *Attorney, Agent, or Firm* — Dinsmore & Shohl LLP

(57) ABSTRACT

A proportional hydraulic valve has a valve housing, an actuating device and a valve piston axially movable in a piston chamber of the valve housing. The valve housing has at least one pressure connection and at least one connection port. The valve piston blocks a flow path between the pressure connection and the connection port or releases it proportionally by moving the valve piston proportionally to an actuating force generated by the actuating device between a closed position and an open position. The valve piston has a first and a second spool area with a circumferential recess in the axial direction after the first and before the second spool area. The recess together with the piston chamber forms a pressure chamber and the pressure connection opens into the pressure chamber. A first diameter of the first spool area is larger than a second diameter of the second spool area.

28 Claims, 6 Drawing Sheets

(56) References Cited

U.S. PATENT DOCUMENTS

| | | | |
|---|---|---|---|
| 2006/0065315 A1* | 3/2006 | Neff | F16K 27/0263 |
| | | | 137/625.65 |
| 2009/0255593 A1* | 10/2009 | Nordstrom | F16K 31/0613 |
| | | | 137/544 |
| 2012/0048400 A1* | 3/2012 | Schudt | F16K 31/0613 |
| | | | 137/528 |
| 2013/0167950 A1* | 7/2013 | Nomichi | G05D 16/2013 |
| | | | 137/487.5 |
| 2013/0207012 A1* | 8/2013 | Williams | F16K 31/0658 |
| | | | 251/129.07 |
| 2016/0017991 A1 | 1/2016 | Boban et al. | |
| 2016/0222633 A1* | 8/2016 | Kang | E02F 9/2267 |
| 2017/0051836 A1* | 2/2017 | Guarino | F16K 11/0708 |
| 2017/0114912 A1* | 4/2017 | Staedele | F16K 15/1826 |
| 2018/0163888 A1* | 6/2018 | Ishikawa | F16K 31/06 |
| 2019/0249788 A1* | 8/2019 | Tanimura | F16K 11/0708 |
| 2019/0309860 A1* | 10/2019 | Alger | F16K 5/0235 |
| 2019/0390690 A1* | 12/2019 | Biwersi | F15B 21/0427 |

FOREIGN PATENT DOCUMENTS

| | | |
|---|---|---|
| EP | 2960561 A1 | 12/2015 |
| JP | H04-34574 U | 3/1992 |
| JP | 2009115289 A | 5/2009 |
| JP | 201919963 A | 2/2019 |

\* cited by examiner

PROPORTIONAL HYDRAULIC VALVE

CROSS-REFERENCE TO RELATED APPLICATION

This application claims priority from German Application No. 10 2019 205 640.7 filed Apr. 17, 2019, the entire content of which is incorporated herein by reference.

FIELD OF THE INVENTION

The present invention relates to a proportional hydraulic valve with a valve housing, an actuating device and a valve piston axially movable in a piston chamber of the valve housing.

BACKGROUND OF THE INVENTION

In such valves, the valve housing has at least one pressure connection and at least one connection port. The valve piston blocks a flow path between the pressure connection and the connection port or proportionally releases this flow path by the valve piston moving between a closed position and an open position in the piston chamber in proportion to an actuating force generated by the actuating device. The connection port is often a tank port or return connection. Such a proportional hydraulic valve is known from DE 10 2005 022 693 A1, for example.

The proportional hydraulic valves known from the prior art regularly fulfil the intended function very well, for example as proportional pressure limiting valves. Pressure limiting valves have the task of limiting the system pressure to a certain nominal pressure. As soon as the nominal pressure is reached, the pressure limiting valve responds and the excess volume flow is directed from the pressure connection to the connection port or tank connection respectively. However, especially at high nominal pressures of, for example, more than 300 bar, an increased back pressure at the valve piston can occur. In this context, back pressure is the pressure difference between the pressure connection and the connection port or tank connection respectively.

To overcome this problem, the proportional hydraulic valves designed as poppet valves have smaller seats in order to obtain a smaller pressurized area. The disadvantage of this is that the volume flow also decreases, i.e. relatively little volume can flow in the open position of the valve.

SUMMARY OF THE INVENTION

Hence, it is the object of the present invention is to provide a proportional hydraulic valve at which a low back pressure can be achieved, especially at high nominal pressures, while at the same time a sufficient volume flow can flow between the pressure connection and the connection port or tank connection respectively.

The problem is solved with a proportional hydraulic valve as described herein. Preferable further embodiments are also described.

The proportional hydraulic valve according to the invention is characterized over the proportional hydraulic valves known from the state of the art in that the valve piston has a first spool area and a second spool area, and the valve piston has a circumferential recess after the first spool area and before the second spool area in the axial direction, and the recess together with the piston chamber forms a pressure chamber and the pressure connection opens into the pressure chamber. Furthermore, the proportional hydraulic valve according to the invention is characterized in that a first diameter of the first spool area is larger than a second diameter of the second spool area. The axial direction in the sense of the invention means the direction from the actuating device to the valve piston.

Due to the configuration of the valve piston as a spool-like valve piston in accordance with the invention, it can be achieved that the back pressure is relatively low, although a relatively large flow cross-section is available. This is because the effective or pressurized differential area is formed by the difference between the area of the first spool area as a function of the first diameter and the area of the second spool area as a function of the second diameter. Depending on the nominal pressure and the application for which the proportional hydraulic valve is to be used, a sufficiently large flow cross-section and a correspondingly small differential area can thus be selected so that overall a low back pressure is achieved despite a high maximum volume flow at particularly high nominal pressures.

Preferably the valve piston has a closing element in front of the first spool area in the axial direction and the valve housing preferably has a valve seat, whereby the closing element rests on the valve seat when the valve piston is in the closed position. The closing element may in particular be a valve cone. This provides particularly good sealing in the closed position and largely prevents leakage oil flow from the pressure connection to the connection port or tank connection respectively.

Preferably, the piston chamber has a first annular groove in front of the pressure connection in the axial direction, the connection port opening into the first annular groove and the valve seat being formed on a circumferential edge of the first annular groove, the first spool area positively covering the valve seat on a lift-off movement path. This increases operational reliability, since during a lifting movement of the valve piston from the valve seat from the closed position towards the open position, initially only a leakage oil flow from the pressure chamber to the first annular groove flows. Only when the valve piston has finished the lift-off movement distance a larger cross-section is released, so that a larger volume flow can flow from the pressure chamber to the first annular groove.

Preferably, the valve piston has at least one cut portion extending axially from the recess into the first spool area, the at least one cut portion being radially only partially circumferential. In other words, the at least one cut portion is not radially circumferential. Through the cut portion, the flow cross-section can be increased so that a larger volume flow can flow from the pressure connection to the connection port or tank connection respectively.

Preferably, the at least one cut portion has at least partially a cross-sectional area that increases in the axial direction. This allows the flow cross-section to increase gradually rather than abruptly. Overall, this results in a better response behaviour of the proportional hydraulic valve.

Preferably, the valve piston has two or more cut portions that are evenly distributed around the circumference. By providing two or more regularly arranged cut portions, it can be prevented that the valve piston is subjected to a force on one side and therefore runs eccentrically.

Preferably, the piston chamber has a damping chamber at one axial end, wherein the valve piston has a circumferential damping groove in fluid connection with the connection port and wherein a damping gap extends axially from the damping groove between the valve piston and the piston chamber, the damping gap being in fluid connection with the damping chamber. This dampens the movement of the valve piston in the piston chamber, which leads overall to a reduction or suppression of undesirable vibrations. The damping gap must be selected according to the desired damping.

Preferably, the second spool area is guided in a guide section of the piston chamber, the damping chamber being arranged in the axial direction after the guide section and the damping groove being formed on the second spool area so that the damping gap extends in the axial direction. This allows a particularly simple manufacture of the valve housing as well as a simplified assembly of the proportional hydraulic valve.

Preferably, the valve piston has an axial blind bore, a first bore passing radially through the valve piston and a second bore passing radially through the valve piston, the first bore being in fluid connection with the connection port and the second bore being in fluid connection with the damping groove. Consequently, the damping is arranged in the low-pressure area via the damping gap. When the valve piston moves from the closed position (or an intermediate position) in the direction of the open position, hydraulic oil is sucked into the damping chamber from the connection port or tank connection respectively via the first bore, the blind bore, the second bore and the damping gap. Accordingly, when moving from the open position (or an intermediate position) in the direction of the closed position, hydraulic oil is pressed from the damping chamber into the connection port or tank connection respectively via the first bore, the blind bore, the second bore and the damping gap. This allows a simple damping of the movement of the valve piston.

Preferably, at least one circumferential second annular groove is disposed on the second spool area. The annular groove suppresses a leakage oil flow from the pressure chamber via the second spool area. Of course, two or more second annular grooves can also be provided, whereby care must be taken that the axial length of the second annular grooves does not lead to eccentric displacement of the valve piston.

The proportional hydraulic valve is preferably a proportional pressure limiting valve. Depending on which actuating device is used, a proportional pressure limiting valve with a falling or rising characteristic curve can be realized. Alternatively, the proportional hydraulic valve can be a pilot-operated check valve.

The problem is also solved with a hydraulic system with a proportional hydraulic valve according to the invention. For example, the proportional hydraulic valve according to the invention can be used in a hydraulic system for pump control or for pressure limitation in a LS system.

BRIEF DESCRIPTION OF THE DRAWINGS

In the following, the invention is explained in more detail by means of an exemplary embodiment shown in the figures. It is shown schematically.

DETAILED DESCRIPTION OF THE INVENTION

Figure 1:
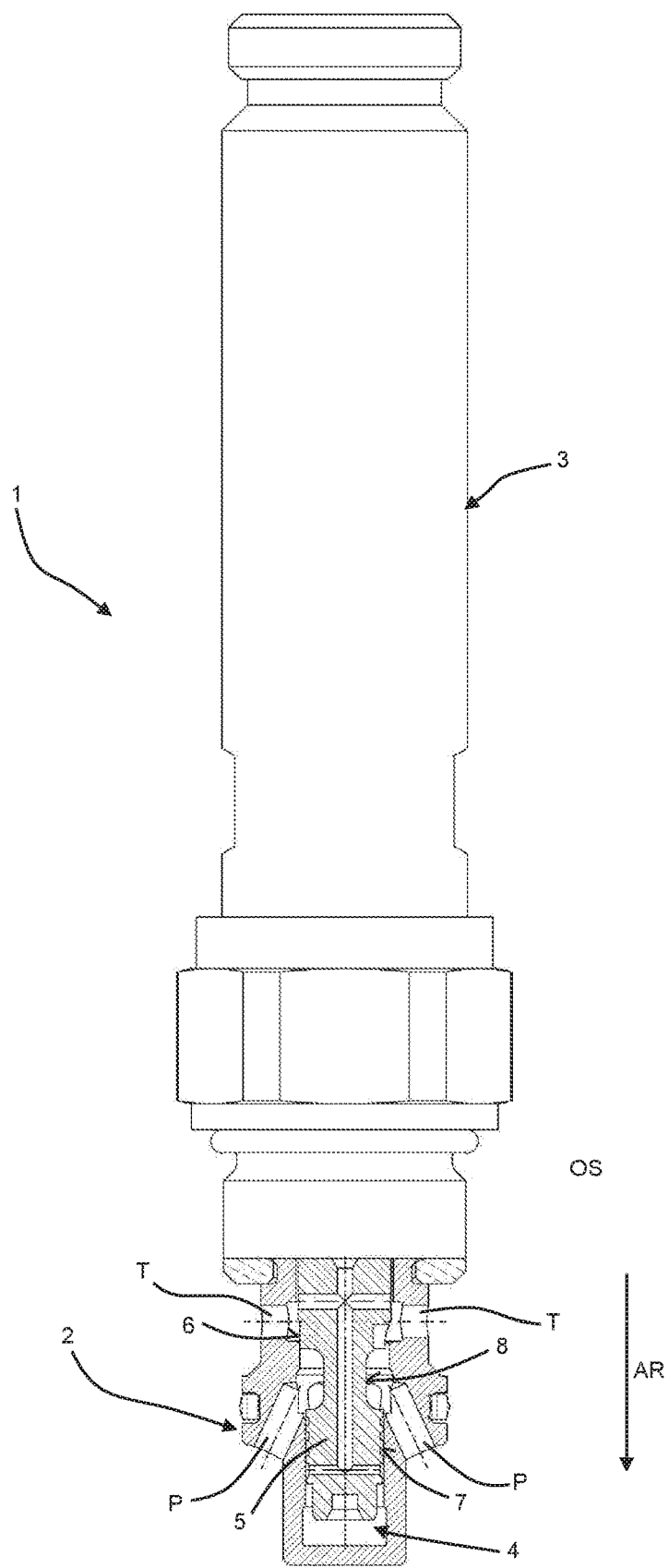
FIG. 1 is a partially sectional side view of a proportional hydraulic valve according to the invention in an open position.

In FIG. 1 a proportional hydraulic valve 1 according to the invention is shown as a partial sectional view. In this embodiment, the proportional hydraulic valve 1 is a proportional pressure limiting valve. However, the hydraulic valve 1 can of course also be configured in such a way that it fulfils another hydraulic function, for example as a pilot-operated check valve. The proportional pressure limiting valve 1 has a valve housing 2 (shown cut in FIG. 1) and an actuating device 3. In addition, the valve housing 2 has several pressure connections P arranged radially circumferentially at regular intervals and several connecting ports T axially spaced from the pressure connections and also disposed radially circumferentially at regular intervals. In this embodiment, the connection ports T represent tank connections. In this embodiment, the pressure connections P are inclined and the tank connections T are arranged perpendicular to the valve piston 5. The inclination of the pressure connections P and tank ports T relative to the valve piston 5 can be adjusted as required.

Figure 2:
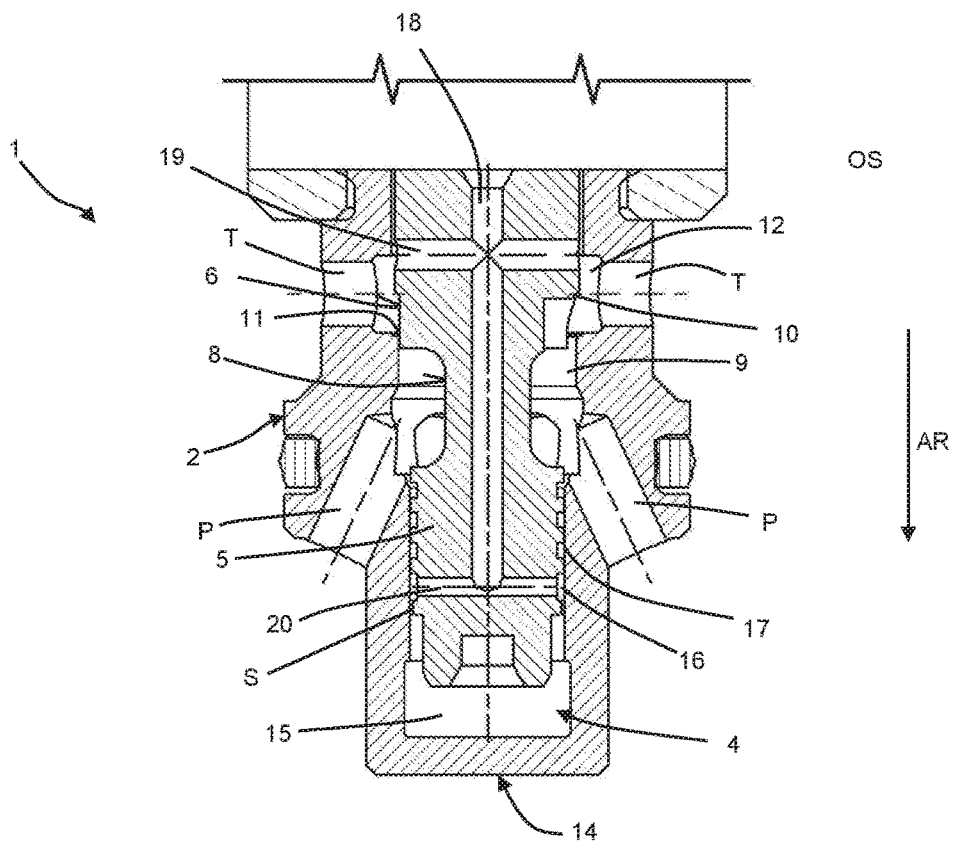
FIG. 2 is an enlarged view of the proportional hydraulic valve shown in FIG. 1.

The actuating device 3 may in particular comprise an electro-proportional solenoid and possibly a spring unit, depending on whether the pressure limiting valve 1 is to be configured with an increasing or decreasing characteristic curve. A piston chamber 4 is formed in the valve housing 2, in which a valve piston 5 is arranged axially movable in proportion to the actuating force of the actuating device 3 between a closed position SP (see FIG. 3) and an open position OS (see FIGS. 1 and 2) in order to block or proportionally release a flow path between the pressure connections P and the tank connections T.

The valve piston 5 is configured like a spool piston and has a first spool area 6 and a second spool area 7. The second spool area 7 is guided in a guide section 17 of piston chamber 4. In an axial direction AR, i.e. in the direction from the actuating device 3 to the valve housing 2, a circumferential recess 8 is formed between the first spool area 6 and the second spool area 7. As can be seen in particular in FIG. 4, the recess 8 merges with a gently radially outward widening transition into the corresponding spool area 6, 7. Together with an inner circumferential surface of the piston chamber 4, the circumferential recess 8 forms a pressure chamber 9. The pressure connections P open into the pressure chamber 9 as shown.

Figure 4:
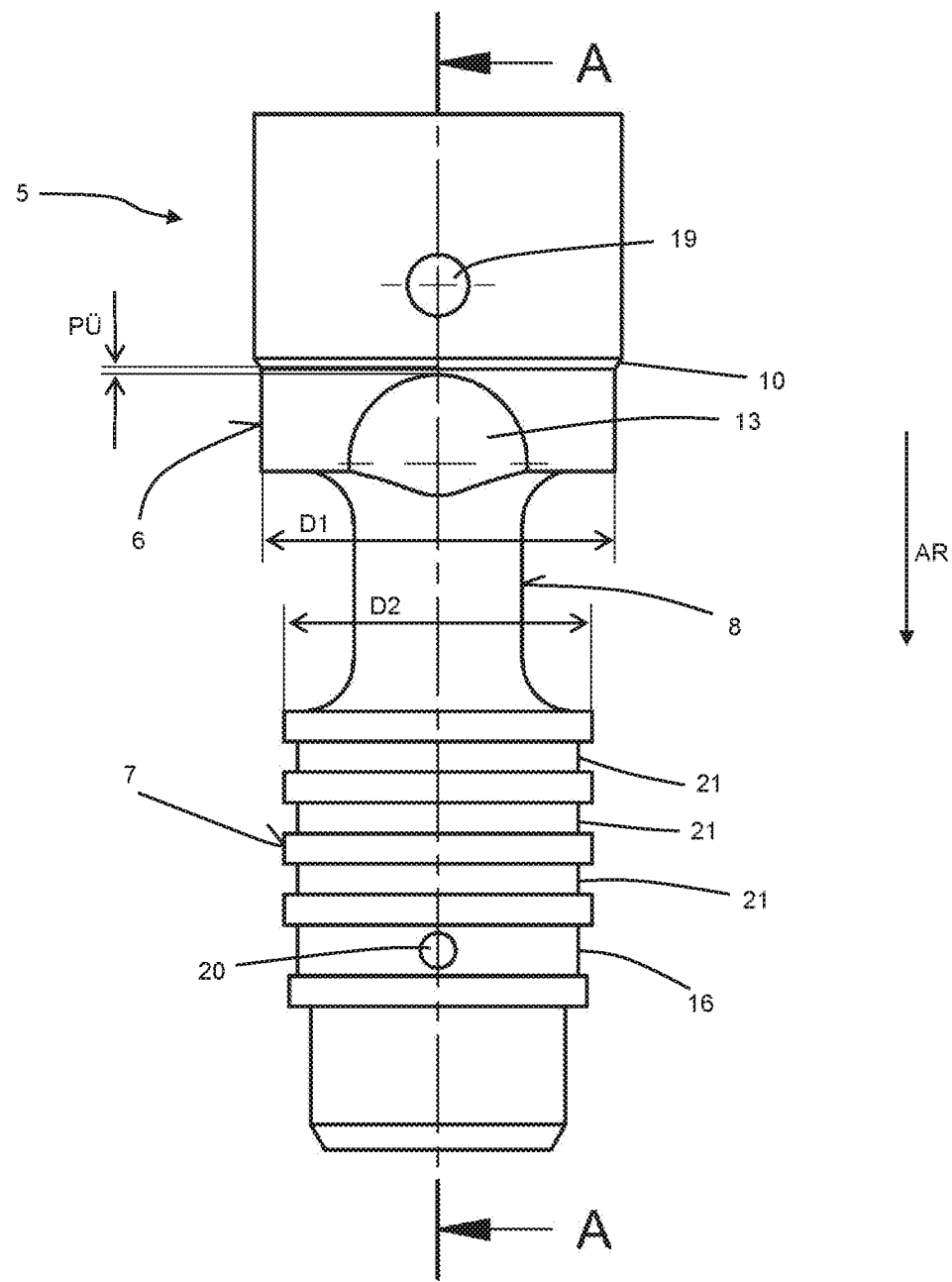
FIG. 4 is a first side view of a valve piston of the proportional hydraulic valve according to the invention.
Figure 5:
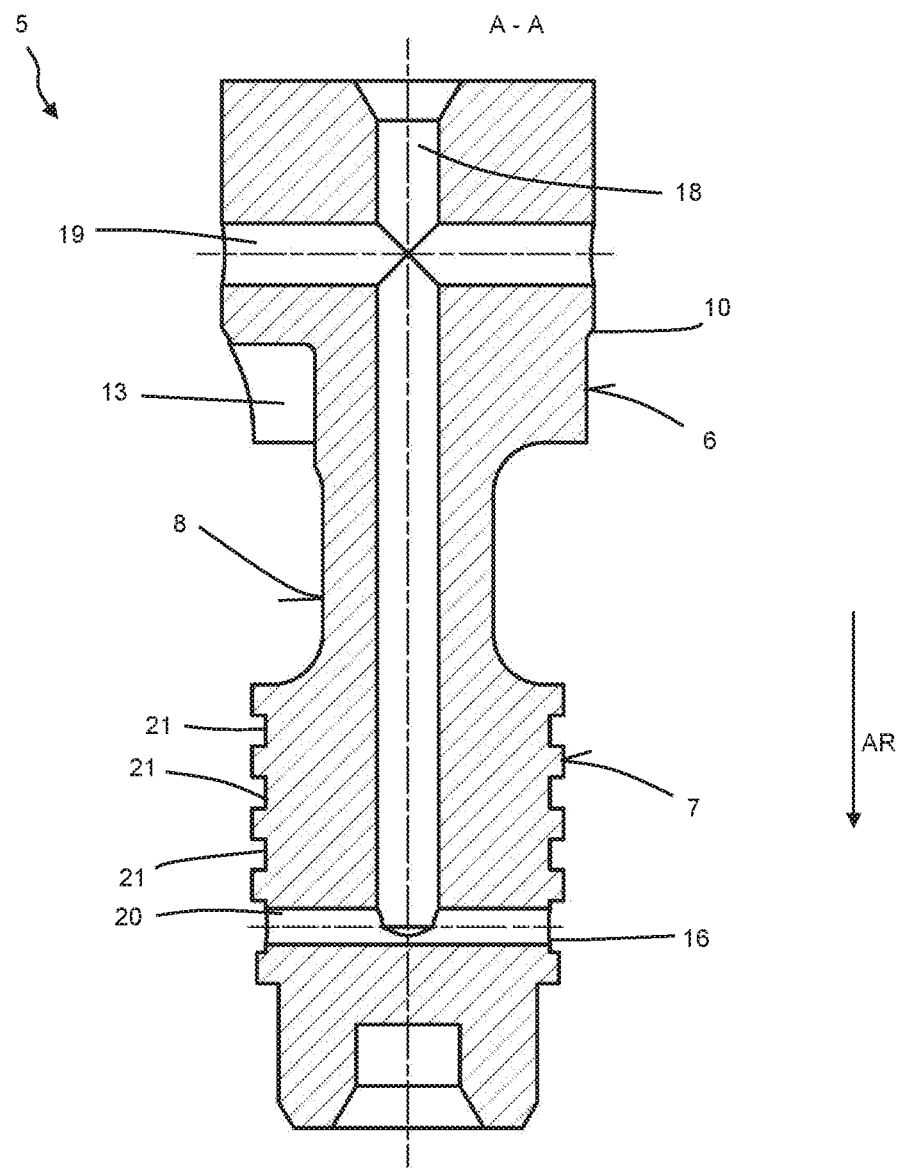
FIG. 5 is a section through the valve piston shown in FIG. 4 along the line A-A.
Figure 6:
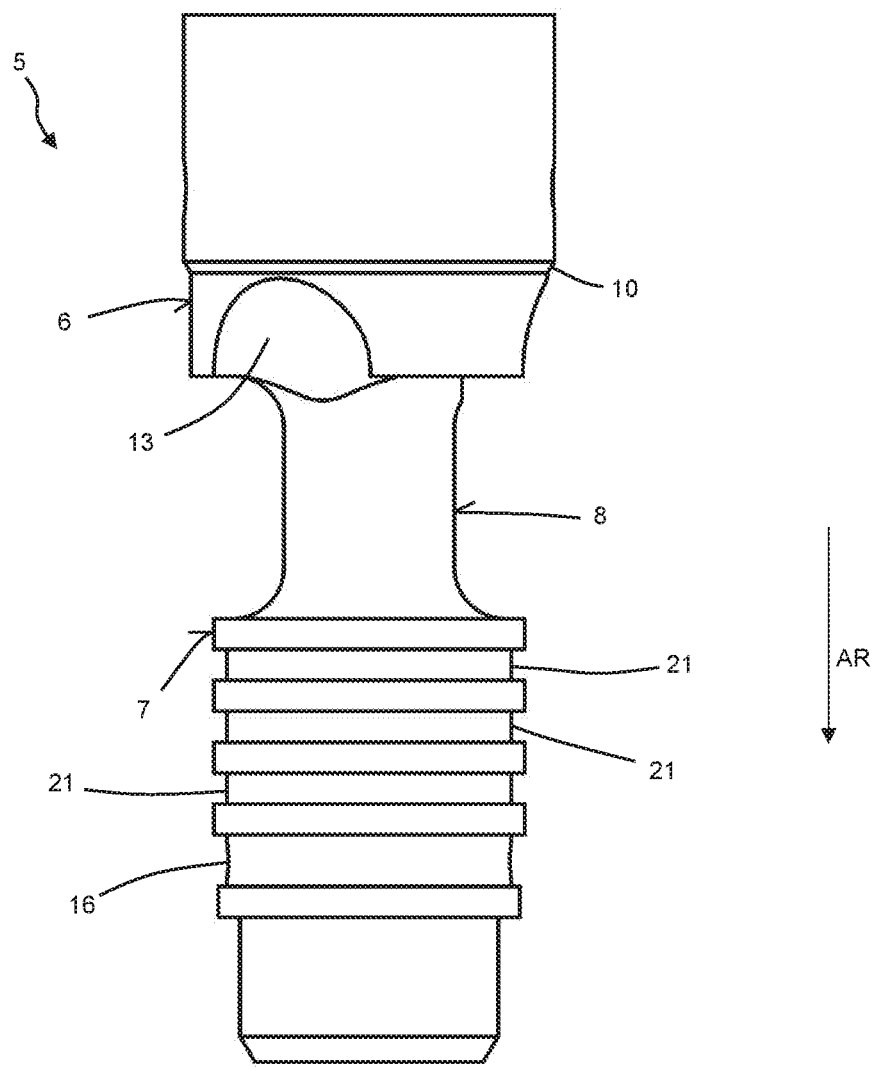
FIG. 6 is a second side view of the valve piston shown in FIG. 4.
Figure 7:
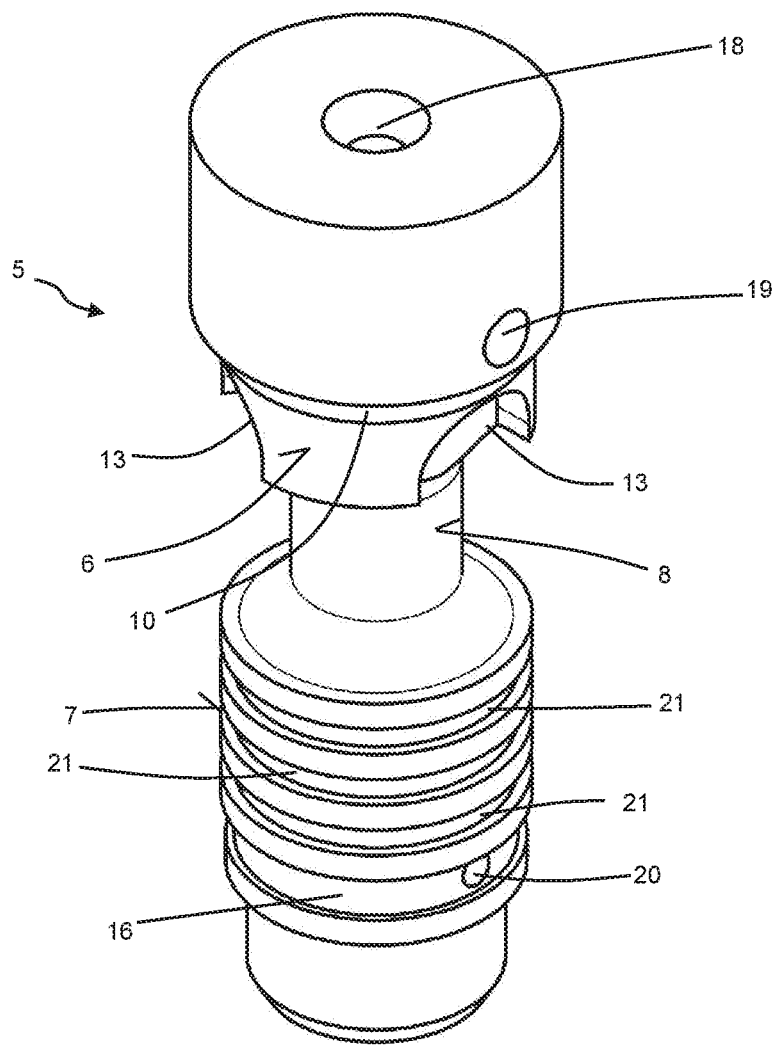
FIG. 7 is a perspective view of the valve piston shown in FIG. 4.

As shown in FIG. 4 the first spool area 6 has a first diameter D1. The second spool area 7 has a second diameter D2 which is smaller than the first diameter D1. Therefore, the pressurized differential area in the pressure chamber 9 is $0.25 \times \pi \times (D1^2 - D2^2)$. This means that relatively large flow cross sections can be realized with a relatively small differential area, which results in a relatively low back pressure.

Figure 3:
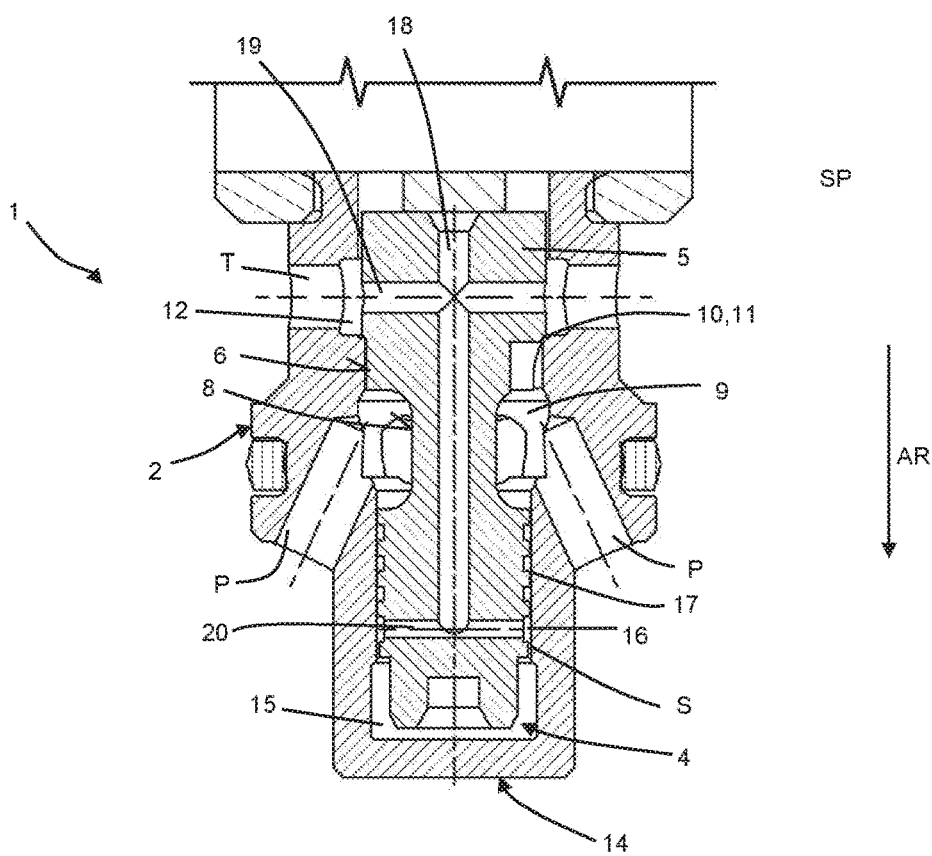
FIG. 3 is the proportional hydraulic valve shown in FIG. 2 in a closed position.

In order to largely prevent a possible leakage oil flow, especially in the closed position SP, the valve piston has a closing element 10 in the form of a valve cone. The valve body 2 has a valve seat 11 against which the valve cone rests in the closed position SP, as shown in particular in FIG. 3. The valve seat 11 is formed on a lower circumferential edge, in axial direction AR, of a first annular groove 12 formed in the piston chamber 4. The tank connections T open into this first annular groove 12 as shown in FIG. 3.

As shown in FIGS. 4 to 7, the valve piston 5 has several cut portions 13 which extend axially from the recess 8 into the first spool area 6. In this embodiment the valve piston 5 has a total of three cut portions 13, which are arranged at regular intervals around the valve piston 5. The cut portions 13 are not radially circumferential and do not extend axially to the valve cone 10. Instead, a positive overlap PÜ is provided between the valve cone 10 and the cut portions 13 in the axial direction AR. In other words, this positive overlap PÜ corresponds in axial length to a lift-off movement path by which piston 5 must first be moved from the closed position SP in the direction of the open position OS before the cut portions 13 open a larger flow cross-section as a flow path between pressure chamber 9 or pressure connections P and the first annular groove 12 or tank connections T. During the movement of the valve piston 5 along the lift-off movement path PÜ, only leakage oil flows from the pressure chamber 9 to the first annular groove 12. The cut portions 13 are configured as shown so that the cross-sectional area of each cut portion 13 increases in the axial direction AR. Consequently, as the distance of movement of the valve piston 5 from the closed position SP to the open position OS increases, an ever-increasing flow cross-sectional area is provided.

Piston chamber 4 has a damping chamber 15 at the axial end 14, viewed in axial direction AR, which is connected to guide section 17 or is arranged after guide section 17 in the axial direction AR respectively. At the second spool area 7 a circumferential damping groove 16 is formed, which is in fluid connection with the first annular groove 12 or the tank connections T respectively. For this purpose, valve piston 5 has an axial blind bore 18, into which a first bore 19 opens, which radially passes through valve piston 5. As can be seen in particular from a comparison of FIGS. 2 and 3, the first bore 19 is in permanent fluidic connection with the first annular groove 12 or the tank connections T respectively in both the open position OS and in the closed position SP. In addition, valve piston 5 has a second bore 20 which passes radially through valve piston 5 and also opens into the blind bore 18. Furthermore, the second bore 20 opens into the damping groove 16 as shown in FIGS. 2 to 5.

A damping gap S is formed in the axial direction AR after the damping groove 16, which allows a relatively low volume flow of hydraulic oil between damping groove 16 and damping chamber 15. During a closing movement of valve piston 5, i.e. during a movement in axial direction AR, the hydraulic oil is pressed out of damping chamber 15 via damping gap S as well as via damping groove 16 and the bores 18, 19, 20 into the first annular groove 12 or to tank connections T. Due to the relatively small flow cross-section of the damping gap S, this movement is therefore damped. Accordingly, when valve piston 5 moves in the opposite direction, hydraulic oil is sucked from the first annular groove 12 or tank connections T via bores 18, 19, 20, damping groove 17 and damping gap S into damping chamber 15. Accordingly, this opening movement of valve piston 5 also results in damping due to the relatively small flow cross-section of damping gap S.

As shown in all figures, a total of three second annular grooves 21 are also formed on the second spool area 7. The second annular grooves 21 are arranged in axial direction AR after the recess 8 and before the damping groove 16. These second annular grooves 21 suppress a leakage oil flow from the pressure chamber 9 to the damping chamber 15 or to the damping groove 16.

LIST OF REFERENCE SIGNS

1 proportional hydraulic valve/pressure limiting valve
2 valve housing
3 actuating device
4 piston chamber
5 valve piston
6 first spool area
7 second spool area
8 recess
9 pressure chamber
10 closing element
11 valve seat
12 first annular groove
13 cut portion
14 axial end
15 damping chamber
16 damping groove
17 guide section
18 axial blind bore
19 first bore
20 second bore
21 second annular groove
D1 first diameter
D2 second diameter
AR axial direction
OS open position
P pressure connection
PÜ positive overlap/lift-off movement distance
T connection port/tank connection
S Damping gap
SP closed position

The invention claimed is:

1. A proportional hydraulic valve, comprising:
   a valve housing having a piston chamber, the valve housing having at least one pressure connection and at least one connection port;
   an actuating device;
   a valve piston axially movable in the piston chamber of the valve housing between a closed position and an open position, the valve piston operable to block or proportionally release a flow path between the pressure connection and the connection port by the valve piston moving proportionally to an actuating force generated by the actuating device between the closed position and the open position in the piston chamber; and
   the valve piston having a first spool area having a first diameter and a second spool area having a second diameter, the first and second spool areas being guided in and sliding against respective first and second guide sections a guide section of the piston chamber, the first diameter being larger than the second diameter, the first spool area having a first face and the second spool area having a second face, the valve piston further having a circumferential recess after the first spool area and before the second spool area in an axial direction, the circumferential recess together with the piston chamber forming a pressure chamber between the first and second faces, the pressure connection being the only port opening into the pressure chamber in the closed position of the valve piston, the pressure connection opening into and providing fluid into the pressure chamber regardless of whether the valve piston is in the open position or the closed position;
   the pressure chamber having a pressurized differential area defined as a difference between the area of the first spool area as a function of the first diameter and the area of the second spool area as a function of the second diameter.

2. The proportional hydraulic valve according to claim 1, wherein:

the valve piston has a closing element in front of the first spool area in the axial direction; and
the valve housing has a valve seat;
the closing element resting on the valve seat when the valve piston is in the closed position.

3. The proportional hydraulic valve according to claim 2, wherein the closing element is a valve cone.

4. The proportional hydraulic valve according to claim 2, wherein the piston chamber has a first annular groove in front of the pressure connection in the axial direction, the connection port opening into the first annular groove and the valve seat being formed on a circumferential edge of the first annular groove, the first spool area positively covering the valve seat on a lift-off movement path.

5. The proportional hydraulic valve according to claim 1, wherein the valve piston has at least one cut portion which extends axially from the circumferential recess into the first spool area, the at least one cut portion being radially only partially circumferential.

6. The proportional hydraulic valve according to claim 5, wherein the at least one cut portion at least partially has a cross-sectional area which increases in the axial direction.

7. The proportional hydraulic valve according to claim 5, wherein the at least one cut portion comprises two or more cut portions evenly distributed around the circumference.

8. The proportional hydraulic valve according to claim 1, wherein:
the piston chamber has a damping chamber at one axial end
the valve piston has a circumferential damping groove which is in fluidic connection with the connection port; and
a damping gap extends axially from the damping groove between the valve piston and the piston chamber, the damping gap being in fluidic connection with the damping chamber.

9. The proportional hydraulic valve according to claim 8, wherein:
the second spool area is guided in a guide section of the piston chamber;
the damping chamber is arranged in the axial direction after the guide section; and
the damping groove is formed on the second spool area so that the damping gap extends in the axial direction.

10. The proportional hydraulic valve according to claim 8, wherein:
the valve piston has an axial blind bore, a first bore passing radially through the valve piston, and a second bore passing radially through the valve piston, the first bore being in fluidic connection with the connection port and the second bore being in fluidic connection with the damping groove.

11. The proportional hydraulic valve according to claim 1, further comprising at least one circumferential second annular groove is disposed on the second spool area.

12. The proportional hydraulic valve according to claim 1, wherein the hydraulic valve is a proportional pressure limiting valve.

13. The proportional hydraulic valve according to claim 1, wherein the hydraulic valve is a pilot-operated valve.

14. A hydraulic system with a proportional hydraulic valve according to claim 1.

15. A proportional hydraulic valve, comprising:
a valve housing having a piston chamber, the valve housing having at least one pressure connection and at least one connection port;
an actuating device;
a valve piston axially movable in the piston chamber of the valve housing between a closed position and an open position, the valve piston operable to block or proportionally release a flow path between the pressure connection and the connection port by the valve piston moving proportionally to an actuating force generated by the actuating device between the closed position and the open position in the piston chamber; and
the valve piston having a first spool area having a first diameter and a second spool area having a second diameter, the first and second spool areas being guided in and sliding against respective first and second guide sections of the piston chamber, the first diameter being larger than the second diameter, the first spool area having a first face and the second spool area having a second face, the valve piston further having a circumferential recess after the first spool area and before the second spool area in an axial direction, the circumferential recess together with the piston chamber forming a pressure chamber between the first and second faces, the pressure connection opening into the pressure chamber regardless of whether the valve piston is in the open position or the closed position;
the pressure chamber having a pressurized differential area defined as a difference between the area of the first spool area as a function of the first diameter and the area of the second spool area as a function of the second diameter;
wherein the proportional hydraulic valve consists of only two ports.

16. The proportional hydraulic valve according to claim 15, wherein:
the valve piston has a closing element in front of the first spool area in the axial direction; and
the valve housing has a valve seat;
the closing element resting on the valve seat when the valve piston is in the closed position.

17. The proportional hydraulic valve according to claim 16, wherein the closing element is a valve cone.

18. The proportional hydraulic valve according to claim 16, wherein the piston chamber has a first annular groove in front of the pressure connection in the axial direction, the connection port opening into the first annular groove and the valve seat being formed on a circumferential edge of the first annular groove, the first spool area positively covering the valve seat on a lift-off movement path.

19. The proportional hydraulic valve according to claim 15, wherein the valve piston has at least one cut portion which extends axially from the circumferential recess into the first spool area, the at least one cut portion being radially only partially circumferential.

20. The proportional hydraulic valve according to claim 19, wherein the at least one cut portion at least partially has a cross-sectional area which increases in the axial direction.

21. The proportional hydraulic valve according to claim 19, wherein the at least one cut portion comprises two or more cut portions evenly distributed around the circumference.

22. The proportional hydraulic valve according to claim 15, wherein:
the piston chamber has a damping chamber at one axial end
the valve piston has a circumferential damping groove which is in fluidic connection with the connection port; and a damping gap extends axially from the damping groove between the valve piston and the piston chamber, the damping gap being in fluidic connection with the damping chamber.

23. The proportional hydraulic valve according to claim 22, wherein:
the second spool area is guided in a guide section of the piston chamber;
the damping chamber is arranged in the axial direction after the guide section; and
the damping groove is formed on the second spool area so that the damping gap extends in the axial direction.

24. The proportional hydraulic valve according to claim 22, wherein:
the valve piston has an axial blind bore, a first bore passing radially through the valve piston, and a second bore passing radially through the valve piston, the first bore being in fluidic connection with the connection port and the second bore being in fluidic connection with the damping groove.

25. The proportional hydraulic valve according to claim 15, further comprising at least one circumferential second annular groove is disposed on the second spool area.

26. The proportional hydraulic valve according to claim 15, wherein the hydraulic valve is a proportional pressure limiting valve.

27. The proportional hydraulic valve according to claim 15, wherein the hydraulic valve is a pilot-operated valve.

28. A hydraulic system with a proportional hydraulic valve according to claim 15.

* * * * *